July 29, 1958
L. W. CORBETT
2,844,889
SEALING MEANS FOR A ROLL ASSEMBLY IN THE ENTRANCE OR
EXIT PASSAGE OF A PRESSURE OR VACUUM CHAMBER
Filed May 27, 1955
4 Sheets-Sheet 1
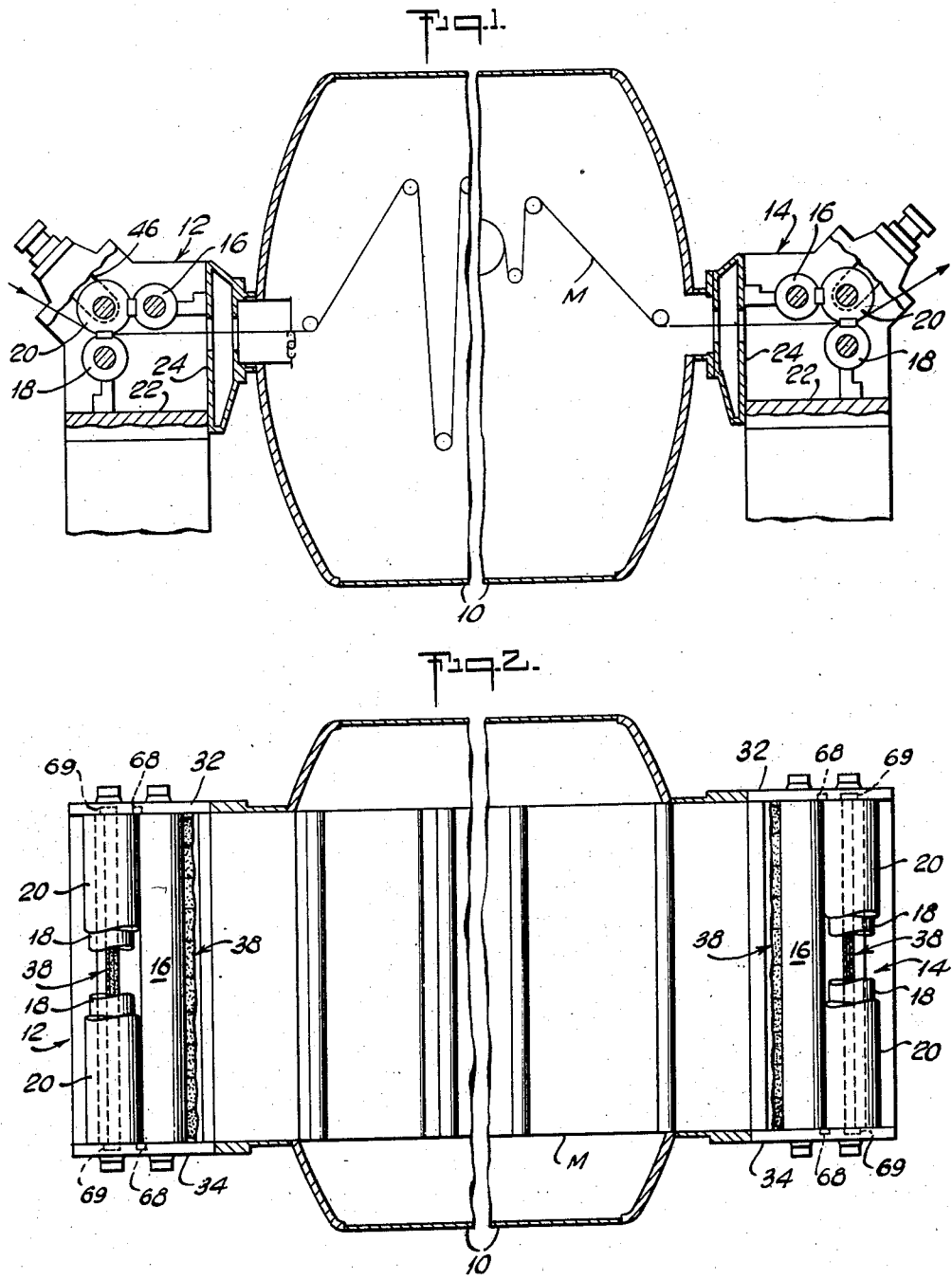
INVENTOR
LAWRENCE W. CORBETT
BY
Hoag, Killburn & Carlson
ATTORNEYS

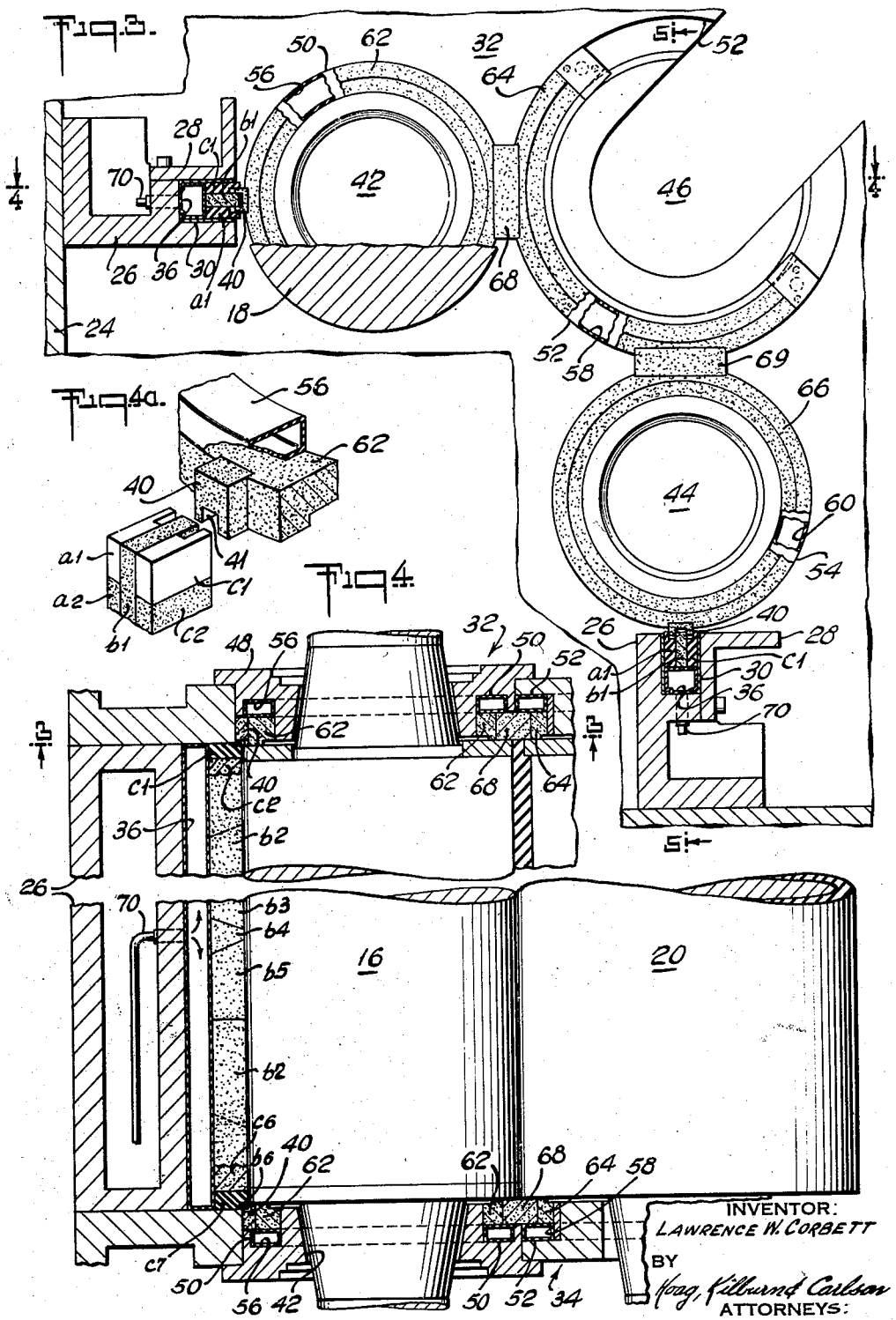

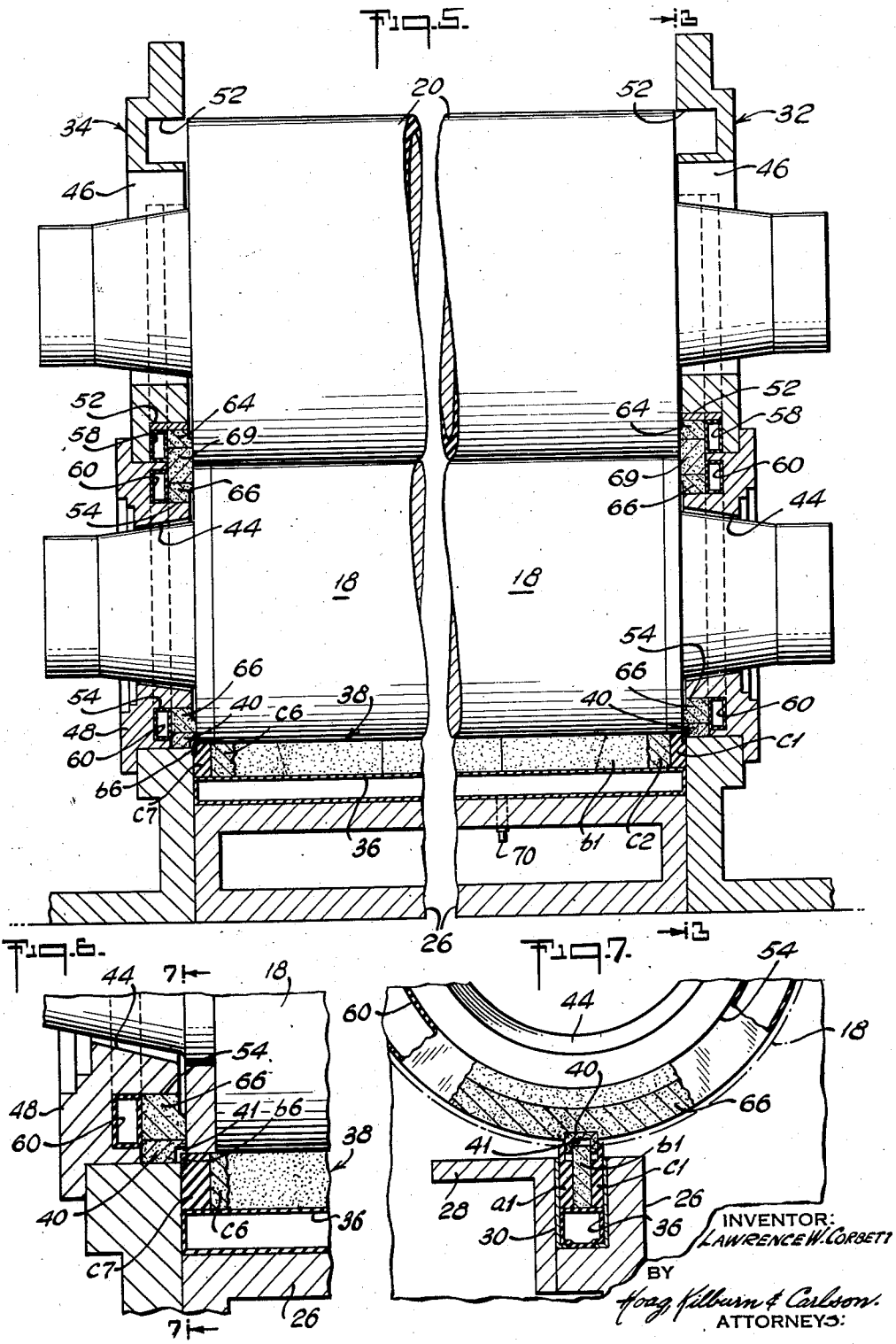

July 29, 1958 L. W. CORBETT 2,844,889
SEALING MEANS FOR A ROLL ASSEMBLY IN THE ENTRANCE OR
EXIT PASSAGE OF A PRESSURE OR VACUUM CHAMBER
Filed May 27, 1955 4 Sheets-Sheet 4
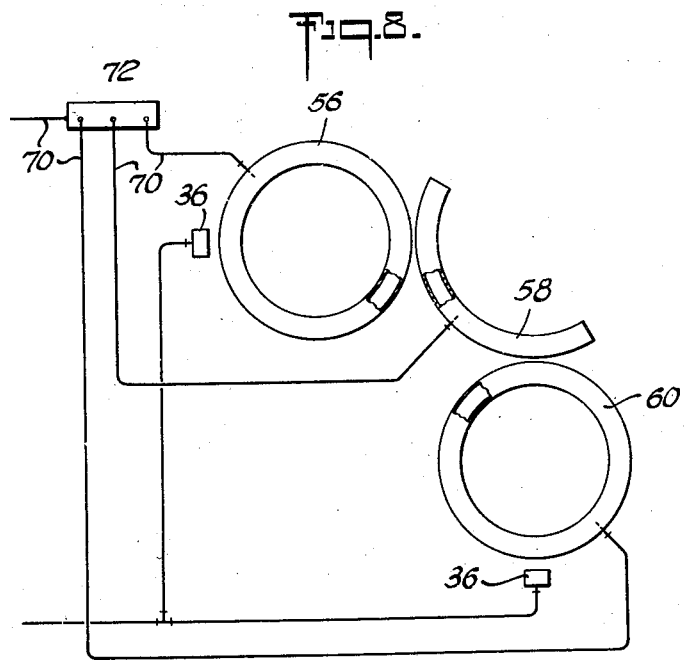
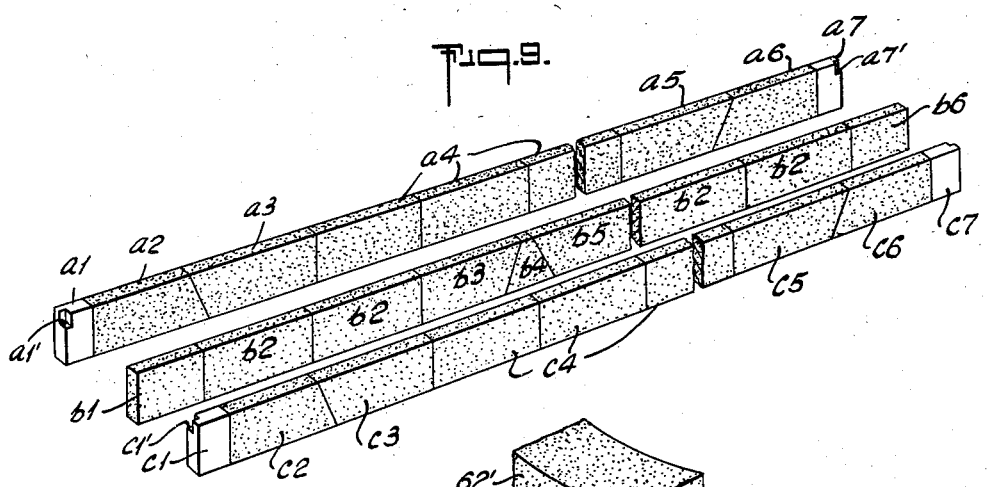
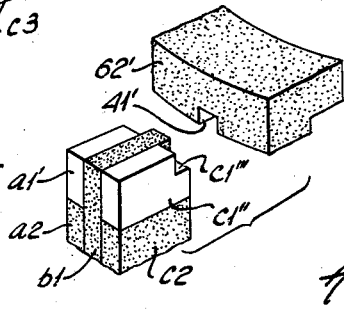
INVENTOR:
LAWRENCE W. CORBETT.
BY
Hoag, Kilburn & Carlson.
ATTORNEYS:

United States Patent Office 2,844,889
Patented July 29, 1958

2,844,889

SEALING MEANS FOR A ROLL ASSEMBLY IN THE ENTRANCE OR EXIT PASSAGE OF A PRESSURE OR VACUUM CHAMBER

Lawrence W. Corbett, Worcester, Mass., assignor to Bachmann Uxbridge Worsted Corporation, Uxbridge, Mass., a corporation of Massachusetts Application May 27, 1955, Serial No. 511,670

21 Claims. (Cl. 34—242)

The invention relates to means for providing an improved seal between the wall of a passage leading into, or from, a vacuum or pressure chamber, and roll means mounted in said passage.

In vacuum or pressure chambers of the prior art, into, or from which, lengths of material have been led between rolls, difficulty has been experienced in providing a satisfactory seal. It has been found that prior art cross seal means between an entrance or exit passage wall and the surface of a roll did not provide a complete or uniform contact across the whole length of a roll, due to small variations in the width of the cross seal member, and in the diameter of the roll, and due to uneven wear of local areas of the roll surface and the edge of the cross seal; that at the ends of a roll leakage occurred between the ends of the cross seal and the end seal means employed, and also between the end seals for two adjacent rolls. In order to reduce wear and the expense of power required to rotate the rolls it is desirable that the seal means employed make a dependable sliding or wiping contact with the roll surface respectively with a minimum of friction.

It is the object of this invention to provide improved seal means of the kind described.

Another object of the invention is to provide a combination of seal means which will provide a dependable seal around the whole perimeter of a roll assembly.

Another object is to provide improved cross seal means for contacting a roll surface.

Another object is to provide improved seal means at the ends of a roll assembly.

Another object is to provide a seal joint or interlock between cross seal and end seal means which coact to provide a seal entirely around a roll assembly, between the assembly and the walls of a passage or chamber in which the rolls are mounted for rotation. The term chamber is used broadly and includes a vessel.

The invention will best be understood if read in connection with the accompanying drawings in which Figure 1 is a vertical section of a device embodying the invention, taken along its longitudinal center line, Figure 2 is a plan view of a horizontal section through the device shown in Figure 1, Figure 3 is an end view of a cross section taken on the line 3—3 of Figure 4, Figure 4 is a horizontal section taken on the line 4—4 of Figure 3, Figure 4a is a detail view in perspective of an end of a cross seal member and an end seal member, herein referred to as a tongue block, with which it coacts, Figure 5 is a vertical section taken on the line 5—5 of Figure 3.

Figure 6 is a detail view showing in enlarged scale the interrelation of one end of a cross seal and a tongue block forming part of a combination of end seal means, Figure 7 is an enlarged detail sectional view taken on the line 7—7 of Figure 6, Figure 8 is a diagrammatic view of a conduit system for inflating the air bags to exert pressure on the various seal members, Figure 9 is an exploded view of a preferred cross seal member, and Figure 10 is a view similar to Figure 4a but showing a circular end seal, of larger outside diameter than the opposed roll, with its periphery indented to receive an end portion of a cross seal.

In the embodiment of the invention illustrated herein a combination of seal means provide a continuous seal around a roll assembly. End seal means are provided for each end of each roll, between the wall passage and the roll end, and cross seal means are provided between the wall of the passage in which the roll assembly is mounted and the surfaces of the rolls respectively which are at the opposite ends of the roll assembly. End seal means are also provided each of which extends partly over two rolls, i. e., in the embodiment illustrated these end seal members extend over the point of tangency between the middle roll and the end rolls respectively.

It will be understood that a roll assembly may comprise two rolls, or three or more rolls, and in each case cross seals would be provided between the passage wall and each of the rolls which are the end or outer rolls of the assembly, and end seal means would be provided for each end of the assembly, including end seal means bridging over the ends of the rolls at their point of tangency.

In Figure 1 one application of a sealing roll assembly is shown in connection with both the entrance and exit passage of a chamber 10 wherein it is desired to maintain pressure either greater or less than atmospheric while moving a length of material M through the chamber for some kind of treatment, such for example as dyeing, or bleaching. The roll assembly in the entrance passage 12 is the same as the roll assembly shown in the exit passage 14, although oppositely disposed, and the sealing means for each assembly is the same. Each assembly comprises the outer or end rolls 16 and 18 and the intermediate roll 20 mounted for rotation in the side walls of the passage. Roll 20 has a facing of rubber or other yielding material and rolls 16 and 18 are mounted to press against the surface of roll 20. A length of material M, such for example as cloth, paper, or the like, is led into the passage 12 and passed into chamber 10 between roll 18 and roll 20. It is discharged through outlet passage 14 between rolls 18 and 20. The resilient surface of roll 20 will yield and tends to substantially conform to the width and thickness of a length of material passing between it and one of the end rolls, thus closing around the lateral edges of the length of material.

Cross seals are provided between the passage wall and the surface of the end rolls 16 and 18 respectively, and end sealing means are provided between the passage wall and each end face of the assembly, including seal means projecting toward the ends of each roll respectively, and also bridging over the end faces of each pair of contacting rolls at the point of tangency. There is thus provided a continuous seal around the longitudinal perimeter of the whole assembly, between the assembly and the wall of the passage, which serves effectively to maintain the pressure within vessel or chamber 10 and prevent leakage of air in either direction through said assembly.

Projecting from the lower and inner walls 22 and 24 of each of passages 12 and 14 (Figure 1) and in effect forming part of the passage wall, are brackets 26 and 28 which extend across the passage and may be joined together in any suitable way. Each pair of these brackets defines a groove 30 opening toward the surface of end roll 16, or end roll 18, as the case may be, and extending the full length of the roll and a little beyond the respective ends of the roll, to the passage side walls 32 and 34 in which the ends of the rolls are mounted for rotation.

Within each of said grooves 30 is inserted an inflatable member or air bag 36, which may for example be formed of neoprene, and may be premolded to fit in its wall groove. Also inserted in each groove 30, on top of the air bag 36, is a cross seal indicated generally as 38, made up of a plurality of laminations each of which comprises a plurality of parts disposed in end to end relation. As shown in Figures 3 and 9 each cross seal comprises three laminations $a$, $b$ and $c$, of equal depth and over all length.

The middle lamination $b$ comprises sections or segments $b1$—$b6$ at least the leading edge portions of which are made of a material having a low coefficient of friction. As illustrated herein the segments $b1$—$b6$ comprising said middle lamination and the sections or segments $a2$—$a6$ and $c2$—$c6$ comprising the outer laminations $a$ and $c$, which are disposed on either side of lamination $b$, are made of graphite or a composition having a large proportion of graphite, which may be said to be self-lubricating in the sense that although rigid it presses tightly against a moving surface without scarring it and without generating substantial heat. I have had very good results using strips of natural graphite the particles of which are bound together with a bituminous or asphaltic binder, a material which is commercially available under the trade mark "Graphitar" (U. S. Graphite Company).

The end segments $a1$ and $a7$ and $c1$ and $c7$ are made of material such for example as rubber, which conforms when pressed against the passage side walls 32 and 34.

The joints between the segments of each lamination are staggered with respect to the joints of contiguous laminations. Intermediate the ends of each lamination I provide at least two abutting sections the contacting edges of which are inclined; in lamination $a$ the segments $a2$, $a3$ and $a5$, $a6$; in lamination $b$ the segments $b3$, $b4$ and $b5$; and in lamination $c$ the segments $c2$, $c3$ and $c5$, $c6$. The abutting inclined edges cause an increment of force directed at right angles to the cross seal as a whole, as by fluid pressure transmitted through an air bag 36 to act longitudinally of the cross seal, thus causing all the segments of each lamination to be pressed tightly together in edge to edge contact, and causing the end segments $a1$ and $a7$ of lamination $a$ and end segments $c1$ and $c7$ of lamination $c$ to be pressed outwardly against the side walls 32 and 34 respectively of the passage.

The lateral extremities of lamination $b$, and more exactly the lateral extremities of segments $b1$ and $b6$, are received in the tongue blocks 40 respectively, which form part of the sealing means at each end of the roll assembly which will now be described.

The end sealing means is best seen in Figures 3, 4, 5 and 6. As the end seal means at each end of the roll assembly is the same it is only necessary to describe the sealing means for one end of the assembly. In Figure 3 the reader is looking at the inside of a passage side wall. The side walls 32 and 34 each have openings 42, 44 and 46 respectively to receive the trunnions of the rolls 16, 18 and 20 respectively. Openings 42 and 44 may be provided in wall sections 48 which are removable for convenience in mounting the end seal means (see Fig. 5). In each side wall grooves 50, 52 and 54 are provided opening toward an end of the roll assembly and in these grooves air bags 56, 58 and 60 are inserted. As illustrated grooves 50 and 54 are circular and groove 52 is a portion of a circle.

Grooves 50 and 54 are opposed to the respective ends of rolls 16 and 18 and groove 52 is opposed to the end of roll 20. The air bags which are inserted in said grooves conform to their shapes respectively and it will be seen from Figures 8, 4 and 5 that air bags 56 and 58 approach close together opposite the line of tangency between rolls 16 and 20, and air bags 58 and 60 approach close together opposite the line of tangency between rolls 20 and 18.

In grooves 50 and 54 ring seals 62 and 64 are inserted in front of air bags 56 and 60 respectively. In groove 52 the seal member 64 is inserted in front of air bag 58. Where the air bags 56 and 58 approach close together, which is opposite the line of tangency between rolls 16 and 20, a rectangular seal member 68 bridges the slight space between them and overlies adjacent portions of these air bags and interconnects seal members 62 and 64. Similarly, where air bags 58 and 60 approach close together, which is opposite the line of tangency between rolls 20 and 18, another rectangular seal member 69 is provided, bridging the slight space between air bags 58 and 60 and interconnecting seal members 64 and 66.

The adjacent edges of seal members 62 and 64 and 64 and 66 are indented to receive the interconnecting rectangular blocks 68 and 69 respectively. Thus a continuous seal combination is provided across a roll assembly end in which the several seal elements are closely related but are movable individually and respond individually to pressure in the respective air bags to press against the roll ends, with seal blocks 68 bridging over the ends of each pair of rolls opposite their line of tangency. The resulting seal is more effective than is obtained by using rigid rings in direct contact tangentially.

I provide an interlock between the cross seal members and the rigid ring seal members which bear against the ends of the outer or end rolls of the roll assembly and for this purpose I provide a reentry groove or indentation in the outer peripheries of said ring seal members respectively. If the outside diameter of the ring seal is less than the outside diameter of the opposed roll I employ the tongue blocks 40 as part of the seal assembly at each end of the roll assembly. The peripheries of seal rings 62 and 66 are indented opposite the cross seals and tongue blocks 40 are tightly fitted into said indentations over the portions of air bags 56 and 60 respectively which underlie said indentations, and extend outwardly opposite the ends of the cross seals respectively. The outer portion of the inner face of each tongue block is grooved or recessed at 41 to receive the end of the middle lamination of the opposed cross seal, and the outer laminations are cut away to receive the tongue block walls which define the groove, leaving wall portions which overlie the outer faces of said tongue block walls.

If the end seal rings 62 and 66 are made of larger outside diameter respectively than the opposed rolls the outer periphery of each ring seal may be indented opposite the ends of the cross seals and the cross seal may be engaged directly with the ring seal as shown in Figure 10. If seal members 40 are used they are interrelated to ring seals 62 and 66 respectively, but like the other end seal members they are movable individually toward or away from an end of the roll assembly. When the cross seal comprises three laminations as described herein it is the ends $b1$ and $b6$ of the middle lamination $b$ which are received in the respective grooves or recesses 41 of the opposed tongue blocks 40. The ends of laminations $a$ and $c$ abut against the tongue blocks respectively on opposite sides of the slot or recess 41. There is thus provided an interlock between the end seal means and the cross seal means by which the seal is extended entirely around the perimeter of the roll assembly, between the assembly and the wall of the passage in which the assembly is mounted.

The end seal members, or at least their contact surfaces, are made of a material having a low coefficient of friction, preferably graphite, as in the case of the cross seals. Each end seal member and each cross seal section is movable individually, in response to fluid pressure exerted by inflating the respective air bags, against respective portions of the perimeter of the roll assembly. The air bags may be inflated simultaneously through a system of air conduits 70 such as is illustrated in Figure 8 by which compressed air may be delivered to the several air bags through the manifold 72 and in which pressure may be maintained which is greater than the differential between the pressure inside and the pressure outside chamber 10. In this arrangement valves for the individual air bags are unnecessary.

It will thus be seen that there has been provided by this invention apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

I claim:

1. Means for effecting an air tight seal between a passage wall and the perimeter of a roll assembly which comprises, inflatable means, a number of integrated seal members, means for supporting said means for pressing against said wall and also in the direction of the perimeter of said assembly, said seal members being disposed in abutting relation providing a continuous seal around the perimeter of said assembly the parts of which are movable individually into contact with respective portions of the perimeter of said assembly, and means for inflating said inflatable means to press said seal members individually against the perimeter of said assembly.

2. Means for effecting an air tight seal between a wall and a moving surface which comprises, inflatable means, a number of seal members each having a contact edge adapted to press against said surface said seal members being so constructed that an increment of force urging them into contact with said moving surface is directed longitudinally of the seal member, means for supporting said inflatable means for pressing simultaneously against the wall and in the direction of said surface and for supporting said seal members in edge to edge contact and disposed between said means and said surface, and means for inflating said inflatable means to press said seal members individually against said surface and simultaneously expand said seal members longitudinally.

3. The device claimed in claim 1 in which some of said seal members comprise sections disposed in alignment end to end.

4. The device claimed in claim 1 in which some of said seal members comprise sections disposed substantially in end to end contact, at least two of said sections which are in abutting relation having opposed, inclined, complementary surfaces respectively to transmit longitudinally of said seal members an increment of force directed against said sections to press them against a portion of the perimeter of said assembly.

5. The device claimed in claim 1 in which some of said seal members are curved and some are straight and the curved members are indented to receive and form an interlock with straight members which abut against them respectively.

6. The device claimed in claim 2 in which said seal members are rigid members the contact surfaces of which have a low coefficient of friction.

7. The combination claimed in claim 1 which includes a laminated seal member comprising a plurality of laminations each comprising a plurality of segments with the joints in one lamination staggered with respect to the joints in another lamination.

8. Means for effecting an air seal between an end of a roll assembly and the wall of a passage in which said assembly is mounted which comprises a plurality of circular seal members, a separate seal member extending between said circular seal members, and inflatable means between the wall and said seal members for pressing said members individually against respective portions of the said end of a roll assembly.

9. The combination of claim 8 in which opposed portions of the circular seal members are indented and portions of said separate member are received in said recesses respectively.

10. The combination of claim 8 including tongue blocks, said circular seal members each having an indentation in its outer edge and a tongue block being received in each of said indentations and projecting radially to receive an end portion of a cross seal.

11. In the entrance or exit passage of a vacuum or pressure chamber, the combination of a roll assembly comprising, a plurality of rolls, mounted for rotation in said passage, and means for providing a seal around the perimeter of the assembly, including a plurality of rigid members projecting into contact with the roll end faces respectively, the said members at each end of the assembly being interrelated to provide a continuous closure across the end faces of the assembly, and rigid cross members, projecting into contact with the respective surfaces of the rolls which are the outer or end rolls of said assembly, and extending beyond the ends of said outer or end rolls respectively, the sealing means for each end of the assembly including members recessed opposite the ends of said cross members respectively to receive the said extended ends of the cross members respectively.

12. Means for providing a seal around the perimeter of a roll assembly, between the assembly and the wall of a passage in which the rolls are mounted for rotation in contact one with another, including cross seal members projectable against the face of the rolls respectively which are the outer or end rolls of the assembly, first end seal members projectable against the end faces of the rolls individually, second end seal members projectable against portions of a plurality of roll end faces simultaneously to bridge over the ends of said rolls at their point of tangency, said second end seal members serving to interconnect said first members, and third end seal members interrelated with the first end seal members for the rolls which are the outer rolls of the assembly and extending opposite the ends of said cross seal members respectively, said cross seal members being extended laterally beyond the roll end faces and said third end seal members being slotted to receive the extended ends of said cross seals respectively.

13. The combination of claim 12 including resilient means between the wall and each of said seal members for projecting said seal members individually against the respective opposed portions of the longitudinal perimeter of said roll assembly.

14. The combination claimed in claim 13 in which a cross seal member comprises a number of sections and said sections are responsive individually to pressure exerted by said resilient means.

15. Means for providing a seal between an end of a roll assembly, and the wall of a passage in which the rolls are mounted for rotation, including, first end seal means projectable against the end faces of the rolls individually, second end seal means projectable against portions of a plurality of roll end faces simultaneously to bridge over the roll end faces, said second means serving to interconnect said first means and provide continuous sealing means across the end faces of an assembly, said end faces sealing means thus comprising several separate members each movable individually toward and away from the assembly around its longitudinal perimeter without breaking the continuity of the combination of said sealing members.

16. In combination, a roll assembly mounted in a passage, the portions of the passage wall opposite the ends of said assembly being grooved with grooves disposed opposite the ends of the rolls respectively comprising said assembly, inflatable means supported in said grooves, seal members intermediate said inflatable members and respective portions of the ends of said assembly, support means extending across the portions of the passage wall opposite the faces of the rolls which are the outer rolls of the assembly, inflatable means and cross seal means supported by said support means, said cross seal means being diposed between said inflatable means and the faces of said outer rolls respectively, and means for inflating all of said inflatable members to press said sealing means against successive portions of the perimeter of the assembly, thus providing a continuous seal around the assembly between the assembly and the wall of the passage.

17. Apparatus for sealing the space between a roll assembly and the wall of a passage in which the rolls are mounted for rotation and through which a length of material is passed between areas of different pressures, which comprises, a plurality of rolls mounted for rotation between the side walls of said passage, sectional seal means extending from said side walls into sliding contact with the respective ends of said assembly providing a continuous seal extending entirely across each end of the assembly, and sectional cross seal means extending from other walls of said passage into sliding contacts with the faces of the respective rolls which are the outer or end rolls of the assembly, providing a continuous seal across the face of each of said outer or end rolls, said cross seal means and said end seal means coacting to provide sealing joints between each end of each cross seal means and each end seal means, thus providing a continuous seal around the entire perimeter of the roll assembly, and means for exerting force on each of the said sections of said cross seal means and said end seal means to press said sections individually against successive portions of the perimeter of said roll assembly.

18. The apparatus claimed in claim 17 in which the cross seal means each comprises a plurality of sectional laminations, the end sections of at least one lamination being resilient to provide for dimensional variations and remain in contact with the said walls of the passage, the sections of said lamination being disposed in end to end contact and the abutting edges of at least two of the sections comprising said lamination being inclined to translate an increment of force pressing a cross seal against an outer or end roll into force directed to press said sections together and said end sections against said side walls respectively.

19. Means for effecting an air tight seal between a wall and the face of a rotating roll which comprises resilient means, a cross seal member having a contact edge adapted to press against the face of said roll, said seal member being divided transversely into at least a plurality of sections in edge to edge relation including at least a pair of sections which meet along a straight inclined interface, means for supporting said seal member disposed between said resilient means and the face of said roll with its contact edge directed toward the face of said roll and for supporting said resilient means for pressing said seal member in the direction of the face of said roll.

20. The device claimed in claim 19 in which the cross seal member is divided longitudinally into a plurality of separate, relatively movable laminations in face to face contact.

21. The device claimed in claim 19 in which the cross seal member is divided longitudinally into three separate, relatively movable laminations, each of said laminations being divided transversely into sections in edge to edge relation including at least a pair of sections which meet along a straight inclined interface.

References Cited in the file of this patent

UNITED STATES PATENTS

| | | |
|---|---|---|
| 5,170 | Preston | June 19, 1847 |
| 1,374,356 | Clouser et al | Apr. 12, 1921 |
| 1,499,483 | Simms | July 1, 1924 |
| 1,633,121 | Minton | June 21, 1927 |
| 2,742,273 | Skivesen | Apr. 17, 1956 |